Jan. 30, 1940.  A. H. MAGEE  2,188,441
AIR VALVE
Original Filed July 24, 1935
Fig.1.
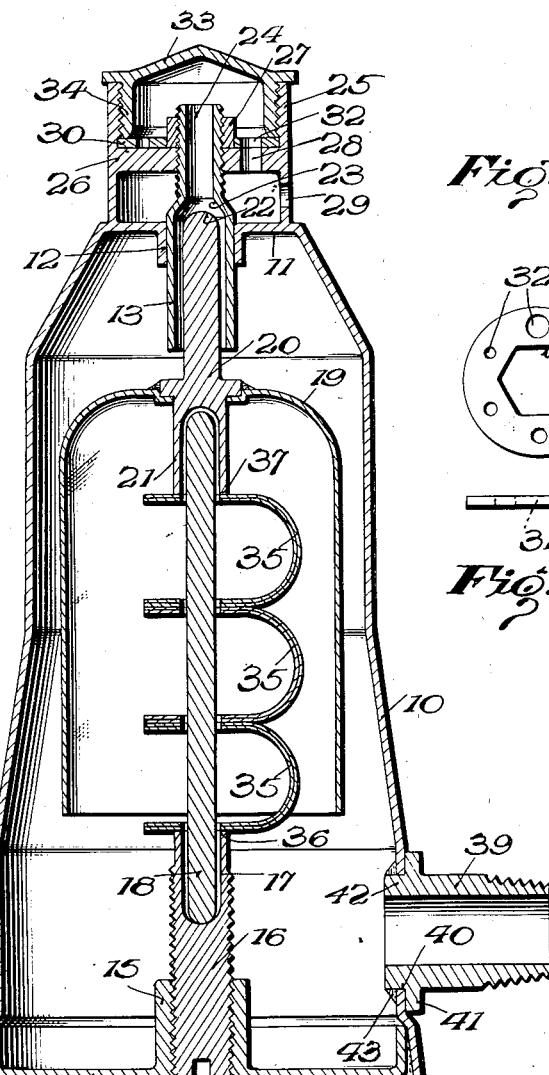
Fig.2.
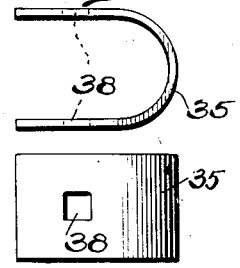
Fig.2a.
Fig.3.
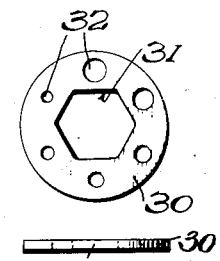
Fig.3a.
Fig.4.
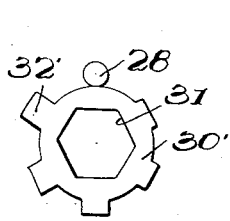
Inventor
Alonzo H. Magee
By
Cameron, Kerkam & Sutton Attorneys Patented Jan. 30, 1940

2,188,441

UNITED STATES PATENT OFFICE 2,188,441

AIR VALVE

Alonzo H. Magee, Westfield, N. J.

Application July 24, 1935, Serial No. 32,958
Renewed June 26, 1939

10 Claims. (Cl. 236—62)

This invention relates to air valves, and while it may be embodied in air valves for a variety of uses, as on blast heaters, risers, mains, unit heaters, coils, etc., wherever an element in a steam system is to be vented, it will be particularly described with reference to its use in air valves for radiators and in the method of controlling a steam heating system by air valves at the radiators.

Air valves for radiators are designed to close to prevent the escape of either steam or water upon contact of the steam or water with the operating mechanism thereof, but to remain open to permit the escape of air when steam is admitted to the radiator, so that the radiator will fill quickly, until the steam reaches said operating mechanism. To this end, it is customary to mount the air valve member on a combined float and thermostat, so that when water rises in the valve casing the float will cause the valve member to close the valve opening and prevent the water of condensation in the radiator from being driven into the room, and when steam enters the valve casing the thermostat will also cause the valve member to close the valve opening by reason of the expansion of the thermostat so as to prevent the escape of steam into the room.

A wide variety of floats and a wide variety of thermostats have heretofore been proposed for air valve structures. Floats in the form of inverted bells that will entrap air and rise because of the buoyancy provided by the entrapped air have frequently been suggested, but so far as I am aware floats of this character have not proved satisfactory. Bimetallic thermostats for the thermostatic operation of the air valve have frequently been suggested and it has also been proposed to associate a bimetallic thermostat with an inverted bell type of float, but devices of this type as heretofore proposed have been open to numerous objections including complexity of construction, bulkiness, uncertainty of operation, etc., and therefore devices of this type have not proved commercially acceptable. Hence today, so far as I am aware, the common type of air valve used commercially is that which employs a hermetically sealed container charged with a volatile liquid and performing the combined functions of a float and a thermostat.

Devices of the latter type, however, are open to certain grave objections because of the fragility of the container which must be sufficiently light in construction so that the device will function properly as a float and must have some portion of the wall thereof sufficiently flexible so that the container may expand and contract when functioning as a thermostat. Combined floats and thermostats of the character just referred to are particularly susceptible to injury from water hammer. Water may accumulate in a radiator because of a variety of reasons over and above those which arise from faulty plumbing or installation; for example, when a radiator is shut off the valve may engage its seat lightly, and although the valve closure is sufficient to prevent return of the water of condensation to the line, steam may leak past the valve and condense in the otherwise closed radiator until a substantial body of condensate has accumulated therein; sinkage of a floor may result in improper drainage from a radiator; etc. Whatever may be the cause of the water in the radiator, when the inlet valve is opened to admit line pressure to the interior of the radiator, the entering steam is likely to drive some or all of the condensate ahead of it, and the momentum of the driven water, when it reaches the air valve, may produce a pressure in the air valve casing that is many times the pressure in the steam line. For example, experience has demonstrated that instantaneous pressures as high as fifty pounds per square inch are not unusual at the air valve when the steam line pressure is five pounds. These high instantaneous pressures at the air valve, which are frequently repeated a plurality of times each time the inlet valve is opened, before the water drains from the radiator, are often sufficient to crush or rupture the combined float and thermostat because the exterior pressure is so greatly in excess of the interior pressure. Even when the combined float and thermostat is not actually crushed or ruptured, experience has demonstrated that the effect of the water hammer blow on the combined float and thermostat unit which carries the valve member is frequently such as to shorten the overall length thereof, and inasmuch as it is customary for the maximum valve movement between wide open and completely closed positions to be on the order of twenty-five thousandths of an inch, any material shortening of the unit upsets the adjustment thereof, so that thereafter when the unit is functioning as a thermostat and reacting against a fixed abutment so that closure of the valve depends on the overall length of the unit, the valve does not close to prevent the escape of steam.

It is an object of this invention to provide an improved air valve which overcomes the foregoing objections and which employs a float and thermostat construction such that the pressure interiorly and exteriorly of the valve operating device is at all times equalized so as to avoid any tendency to crushing, distortion or upsetting of adjustment which have heretofore characterized combined floats and thermostats of the type employing a hermetically sealed container.

Another object of this invention is to provide an improved device of the type characterized which employs an inverted bell type of float and a bimetallic thermostat associated therewith whereby the functions of the float and thermostat operation are obtained without the use of a sealed container which may be distorted or ruptured or have its adjustment upset by reason of a pressure being built up exteriorly of the same in excess of the interior pressure, and which at the same time so combines the thermostat and float that they need occupy no more space or be more complicated than the sealed containers charged with volatile fluids heretofore employed in providing combined floats and thermostats.

Another object of this invention is to provide an improved device of the type characterized whereby proper seating of the valve member is always assured although parts may be out of alignment, whereby sticking of the valve member is minimized and wherein the parts are suitably guided for rectilinear movement.

Another object of this invention is to provide an improved device of the type characterized which includes a bimetallic thermostat combined with an inverted bell type of float wherein the float and thermostat are so related that the parts are not only compactly arranged but are simple in construction and certain in operation.

Another object of this invention is to provide an improved device of the type characterized which upon assembly may be readily adjusted to a predetermined operation and which will retain said condition of adjustment for a relatively long period of time.

Another object of this invention is to provide an improved device of the type characterized which is so constructed as to avoid retention of water in the casing of the air valve by capillary action between the wall of the float and the wall of the valve casing.

Another object of this invention is to provide an improved device of the type characterized which is composed of parts which may be fabricated at relatively low cost, which are easy to standardize, and which may be manufactured and assembled without requiring highly skilled labor.

Another object of this invention is to provide an improved device of the type characterized which is durable in structure and adapted to function without change over a relatively long period of time.

Another object of this invention is to provide an improved device of the type characterized which has an inlet nipple so constructed and assembled with the casing of the air valve that a steam-tight joint may be effected expeditiously and at low cost.

Another object of this invention is to provide an improved device of the type characterized which includes easily settable means for predetermining the rate at which air may escape from the air valve casing and which means is so related to the air valve casing as to assure against unauthorized tampering or upsetting of the predetermined operation for which the device is set.

Another object of this invention is to provide a method whereby a single pipe steam heating system including a plurality of radiators at different distances from the source of steam may be so controlled that substantially simultaneous filling of the radiators with steam will be effected notwithstanding the differences in length of the supply pipes leading to the several radiators.

Further objects will appear as the description of the invention proceeds.

The invention is capable of receiving a variety of mechanical expressions one of which is shown on the accompanying drawing, but it is to be expressly understood that the drawing is for purposes of illustration only, and is not to be construed as a definition of the limits of the invention, reference being had to the appended claims for that purpose.

Referring in detail to the drawing wherein the same reference characters are employed to designate corresponding parts in the several figures—

Fig. 1 is an axial section of an embodiment of the present invention;

Fig. 2 is an elevation and Fig. 2a is a plan of one of the bimetallic elements of which the thermostat is composed;

Fig. 3 is a plan and Fig. 3a is an elevation of the disk which may be set to predetermine the rate at which air may escape from the radiator to carry into effect the novel method of heating control herein to be described; and Fig. 4 is a plan view of an alternative arrangement for predetermining the rate of air flow.

In the form shown, the air valve is provided with an outer casing 10 of any suitable size, construction and material and having any suitable exterior configuration. but preferably of generally tubular form so that it may be conveniently and economically produced by drawing the same from sheet metal. Said casing 10 has a closed end 11, here shown as integral with the lateral wall of the casing, and said end 11 is provided with a central flanged aperture 12 in which is suitably secured a valve seat member 13, as by soldering or brazing. The opposite end of the casing 10 is left open as originally formed, but when completed said end is closed by a flanged cover member 14 which may also be formed of sheet metal and which is provided with a central inwardly directed tubular boss 15 which is interiorly threaded to receive a threaded stud or abutment member 16. Cover member 14 may be telescoped into the end of the casing 10 until its face is flush with the end of the lateral wall thereof, and the same may then be fixedly secured in position in any suitable way as by soldering or brazing, whereby the cover member 14 is secured to the end of the casing 10 by a fluid-tight seal. At its inner end threaded stud 16 is provided with a recess 17 in which is seated a post 18, preferably provided with a spherical inner end and having a loose fit in said recess so that some freedom of movement is provided. Mounted on the opposite end of said post 18 is an inverted bell-shaped float member 19, which may also be drawn from sheet metal, and which is provided with a seat and aperture at its end to receive and have suitably secured thereto, as by soldering or brazing, a flanged valve member 20 which has its inner end projecting interiorly of the bell 19, where it is recessed as shown at 21 to receive the outer end of the post 18. This end of the post is also preferably made spherical and has a loose fit in said recess so as to provide some freedom of movement. The opposite end of said valve member 20 projects loosely into the tubular passage of the valve seat member 13, and the end 22 of said valve member is preferably rounded so as to provide a closing contact with the valve seat 23, formed by decreasing the diameter of the passage 24 through the valve seat member 13, even though the axis of member 20 be not in exact alignment with the axis of the member 13. The valve and valve seat members are preferably formed of hard metal as a silver-nickel alloy so as to minimize wear, to prevent corrosion and formation of verdigris.

The outer extremity of the valve seat member 13 is exteriorly threaded, and threadedly mounted thereon is a casing extension member 25 having an interior transverse wall or partition 26 which has a central interiorly threaded aperture whereby said member 25 may be threaded onto the extremity of the valve seat member 13 until the extremity of said member 25 is butted against the end wall 11, in which position it may be secured in any suitable way as by soldering or brazing. A lock nut or arbor 27 is threaded or otherwise suitably secured to the member 13 and provides a non-circular centering member for a purpose to be described. The transverse wall 26 is provided with a suitable aperture 28 of such size as to provide for the maximum designed flow of air from the air valve casing, and the wall 25 of the casing extension is provided with an aperture 29 opening to the exterior of the casing extension and communicating with the interior thereof at the opposite side of the transverse wall 26 from the opening of the passage 24. Seated on the partition 26 is a disk 30 (see Fig. 3 and Fig. 3a) which has a central aperture 31 shaped to conform with the shape of the nut or arbor 27 and provided with a plurality of apertures 32 of different areas for a purpose to be explained, said apertures 32 being so arranged that one of said apertures will register with the aperture 28 in each of the several positions which the disk 30 may assume when its central aperture 31 is engaged over the nut or arbor 27. Thus when said disk is provided with a hexagonal opening 31 for cooperation with a hexagonal nut or arbor, six apertures are provided, one for each of the sides of the aperture 31, and said apertures progressively increase in area from the smallest designed opening desired, say a diameter of .045", up to the largest designed opening desired, say a diameter of .095". It is to be expressly understood, however, that if desired the aperture 31 may be given a smaller or larger number of sides and a smaller or larger number of apertures 32 may be provided so that a larger or smaller range of aperture areas is obtained, or the gradation between the sizes of the different apertures could be made smaller or larger if desired. An alternative construction, at present preferred, is shown in Fig. 4 wherein the disk 30' is provided with a plurality of radial projections 32' of different radial extent so as to progressively mask the aperture 28 in its several positions of adjustment. Disk 30 may be retained in position in any suitable way, the casing extension 25 here being shown as closed by a cap 32 which has an interiorly projecting exteriorly threaded flange 34 cooperating with an interior thread on the member 25 and having its end beveled to engage the disk 30 and lock the same against the partition 26. Thereby the disk 30 is held in metal to metal contact with the face of the partition 26, which may be machined, and air leakage between said disk and partition is prevented.

Disposed within the inverted bell-type float 19 is a bimetallic thermostat of any suitable construction. As shown, it is composed of a plurality of bimetallic strips 35 of any suitable metal, as copper and steel, which are bent into U form as shown and which may merely rest in contact with each other or which may be secured together at the abutting faces of their legs. While three of said U-shaped members have been illustrated, this is not essential, as a different number of U-shaped strips may be employed without departing from this invention. At their lower extremity, as illustrated in the drawing, said stack of U-shaped members 35 engages the inner end 36 of the threaded stud 16 which constitutes an abutment therefor, and at its opposite or upper end said stack engages the inner end 37 of the valve member 20. Each of the legs of said U-shaped members is provided with a non-circular opening 38 (Fig. 2a), and the post 18 is made of like shape, so that rotation of the U-shaped members around the post 18 is prevented and alignment of the thermostat and valve member is maintained.

The inlet to casing 10 is provided through a threaded nipple 39 secured in an aperture 40 provided in the lateral wall of said casing. According to the present invention the method of attaching said nipple to said casing provides a fluid-tight seal at the joint between the member 39 and the casing 10 which is relatively inexpensive to form. Said member 39 is provided with an exteriorly projecting flange 41 which may be of considerable arcuate extent so as to give the requisite stiffness and strength to the connection between the nipple and casing, and which may be attached to the wall of the casing 10 in any suitable way as by one or more rivets extending therethrough and into the wall of the casing 10 at each side of the nipple. Projecting inwardly from said flange 41 is a tubular extension 42 which substantially fits the aperture 40 and which may be swaged so as to completely seal said aperture. The nipple may then be soldered as indicated at 43 so as to assure a fluid-tight joint throughout the periphery of the inwardly projecting end 42. Thereby escape of steam through the aperture 40 to the space between the flange 41 and wall of the casing 10, and thence to the outside, is effectively prevented without need for making a hermetic seal between the periphery of the flange 41 and the casing wall 10. Hence the flange 41 may be made as large as is desired to secure the requisite rigidity and strength at the supporting nipple without introducing the difficulty of increased likelihood of leakage with increased length of soldered seam. This manner of securing the nipple 39 to the casing 10 provides a relatively expeditious and inexpensive way of attaching said nipple, which may be readily carried out before the cover 14 is secured in position, and the character of the connection effected is such as to minimize leakage around the nipple.

Aperture 29 is preferably placed above the wall 11 so that the chamber below partition 26 provides a trap which will collect such moisture as may be forced through passage 24 before the valve is closed. This moisture tends to condense in said chamber, and as the underside of wall 11 is heated by contact with live steam, it will be vaporized and escape through aperture 29. Hence danger of the valve "spitting" when air is next driven from the radiator is reduced to a minimum.

With the parts assembled in the relationship illustrated on the drawing and with the air valve connected to the radiator through nipple 39 air may escape from the interior of the casing 10 through the clearance between the inner tubular extremity of the valve seat member 13 and the end of the valve member 20, through the valve port 23, and into the chamber in the cap 33 above the partition 26. Thence it may escape through the aperture 28 at a rate determined by disk 30 or 30' and into the chamber below said partition 26, and then pass to the outside air through the aperture 29. If any water is driven into the casing 10 by the advancing steam, the water rising in said casing seals off the lower end of the bell 19, entrapping the air therein, and the further rise of water in the casing 10 causes the bell 19 to rise as a float until the valve member 22 contacts the seat 23, thereby preventing escape of water to the exterior of the casing. On the other hand, when steam enters the casing 10 the thermostat 35 responds promptly to the increase in temperature, and the tendency of the bimetallic strips 35 to straighten under increase in temperature causes the same to lift the valve member 20 until its end 22 engages the seat 23 and thereby prevents the escape of steam to the exterior of the casing. When the bell 19 is acting as a float it is guided both by the coaction of the valve member 20 with the valve seat member 13 at its upper extremity and by the coaction of the inner end of the member 20 with the end of the post 18, so that rectilinear movement of the float and valve member is assured because of the guide thereby provided at the opposite extremities of the member 20. When the valve member is closed by the thermostat 35 rectilinear motion is again enforced because at its lower end the post 18 restrains its movement while at its opposite extremity the valve member 20 is guided by the valve seat member 13. Hence throughout the operation of the device, whether the valve member is being controlled by thermostatic action or by float action, the parts are caused to move rectilinearly. At the same time the looseness of fit and spherical surfaces of contact heretofore described assure proper action and a tight closing contact of the valve member 22 with its seat 23 although the parts may be out of alignment.

When the parts are originally assembled the threaded stud 16 may be adjusted by rotation within the threaded boss 15 so as to advance or withdraw the inner extremity 36 thereof to the extent required to the end that the predetermined valve opening, say .030", shall exist between the valve member 22 and the seat 23 at normal temperatures while the valve member will be tightly engaged with its seat with a reserve of resiliency in the thermostatic elements 35 when steam is in contact with said thermostat. When the parts are in this relationship the threaded stud 16 may be soldered to the cover member 14 so as to prevent change of this delicate factory adjustment after the device is delivered to the trade and to prevent leakage of steam or water through the thread.

In order to prevent retention of water in the air valve casing by capillary action between the bell 19 and the casing wall 10 a substantial clearance, too large for capillary action to be set up, is provided between said walls throughout the entire length of the bell 19. This is made possible because the centering and guiding of the movable elements is effected entirely along the center line of the device, and it is therefore unnecessary that the casing wall so closely surround the bell that the guiding and centering functions are performed by the casing wall, as in the case of commercial structures now in use. Hence certainty of operation in guiding the valve member and its associated float and thermostat rectilinearly is assured while adequate space is provided between the float and casing walls so that water may flow freely away from the spaces within the air valve casing.

The rapidity with which a radiator fills, other things being equal, depends upon the distance of the radiator from the source of steam. Hence a radiator near a boiler will fill with steam much more quickly than a radiator which is located at a relatively remote distance from the boiler. This frequently becomes of very great importance as for example where a heater is controlled by a thermostat in a centrally arranged room, because the heater may be shut down before adequate steam has been supplied to the radiators in the relatively remote rooms. Again, the rate of filling will vary with the size of the radiator.

By the present invention I have provided a method of controlling a single pipe heating system whereby the radiators which are relatively remote may be filled with steam substantially at the same time as those radiators which are relatively close. The same method is also available for securing substantially simultaneous filling of radiators of different size. To this end I control the rate at which air may escape from the radiators in accordance with the distance of the radiators from the boiler, reducing the rate of air escape from the nearer radiators and increasing the rate of air escape for the more remote radiators, so that said radiators will tend to be filling simultaneously. In other words, the rate at which the air may escape from the radiator is made roughly proportional to the distance of the radiator from the boiler, so that the back pressure of air at the nearer radiators will retard the flow of steam thereto while the more remote radiators are filling rapidly. According to the present invention each air valve is provided with a disk 30 or 30' providing a graduated opening for the aperture 28 as heretofore described and the range of graduation in the size of said aperture is made in conformity with the rate at which air escape is desired for the various radiators in the system. By selecting a suitable size of aperture the proper rate of air escape can thus be obtained from each of the radiators in the system. Therefore, when the air valves are installed the disks 30 or 30' are properly arranged so that the size of aperture 28 at each radiator is suitable for the rate of air escape corresponding to the distance of that radiator from the boiler, and hence the robbing of more remote radiators to fill nearer radiators is prevented. When the system is tried out, if the rate of air escape at any radiator is found to be too large or too small, the steamfitter may readily remove the cap 33 and reposition the disk 30 or 30' so that the proper size of aperture 28 is obtained. But under normal conditions the disks 30 or 30' are enclosed within the casing extensions 25 against accidental alteration or unauthorized tampering, and the cooperation of the noncircular aperture 31 with the lock nut or arbor 27 assures that there is no relative rotation between the disk and the partition 26 during operation. In place of the disk being provided with a series of apertures 32 or a series of projections 32' it may be given any other suitable shape or form so as to vary progressively the size of the aperture 28.

It will therefore be perceived that by the present invention an air valve has been provided which entirely avoids the difficulties heretofore experienced with the use of hermetically sealed containers constituting combined float and thermostat elements. Even though a substantial body of water be driven ahead of the steam into the casing 10 to set up a water hammer, the pressure interiorly and exteriorly of the bell 19 is always equalized. Hence the tendency to crush, destroy or shorten the combined float and thermostat unit, which is characteristic of the sealed containers now in common use and wherein the interior pressure is but a fraction of the pressure that may be developed exteriorly by the water hammer, has been entirely avoided. Moreover, the thermostat itself is by its nature and construction such that it is not thrown out of adjustment or injured by the pressures incident to water hammer. At the same time, owing to the construction and arrangement employed the device is relatively compact and need not be more bulky than the combined floats and thermostats using sealed containers. As the thermostat is disposed entirely within the bell 19 no increase in volume within the air valve casing is required as in the case where a bimetallic thermostat has been mounted exteriorly of the float, and at the same time the device is no more complicated than those using sealed containers.

By reason of the construction and relationship disclosed the device may be initially set to a predetermined operation, and this adjustment will be maintained, and the device will thereafter operate with certainty, for a relatively long period of time. As the guiding and centering elements are entirely located at the axis, the requisite space for a free flow of water may be left between the float and casing walls. The thermostat, by using a plurality of U-shaped strips, may be given a considerable reserve resiliency, so that the normal expansion of the thermostat when steam contacts the same will result not only in the valve member being moved into engagement with its seat, but a sufficient tension will be created in the thermostatic member so that said valve member will be pressed tightly against its seat and the escape of steam past the valve member prevented. The interrelationship between the parts is such as to minimize sticking as when the parts get out of alignment and the entire structure is composed of parts which may be made at relatively low cost, by relatively simple machine operations. The device may thus be easily standardized and the manufacture and assembly can be carried out without requiring highly skilled labor.

Furthermore, means have been provided whereby the rate of escape of air may be nicely controlled, and this feature may be utilized in a series of radiators at different distances from a source of heat or of different size so that the rate at which different radiators fill may be controlled to the end that more uniform heating is secured.

While the embodiment of the invention illustrated on the drawing has been described with considerable particularity, it is to be expressly understood that the invention is not restricted thereto, as the same is capable of receiving a variety of mechanical expressions, some of which will now suggest themselves to those skilled in the art, while changes may be made in the details of construction, arrangement, proportion, size, etc., and certain features may be used without other features without departing from the spirit of this invention. Thus the novel combined float and thermostat of the present invention may be used independently of the adjustable disk 30, while the provisions for controlling the rate of air escape from different radiators at different distances from the boiler may be employed in conjunction with air valves using other types of float and thermostat construction. Reference is therefore to be had to the appended claims for a definition of this invention.

What is claimed is:

1. In an air valve, in combination with a casing provided with an air outlet passage, a valve member adapted to open and close said passage, an inverted bell-type float member attached to said valve member and adapted to entrap air and operate as a float in the presence of water, said valve member being provided with a recess within said float member, a recessed abutment member carried by said casing, a post having spherical surfaces of engagement loosely seated within said recesses and having play with respect thereto and extending axially through said float member, and a bimetallic thermostat centered by said post and reacting between said abutment member and said valve member.

2. In an air valve, in combination with a casing provided with an air outlet passage, a valve member adapted to open and close said passage, an inverted bell-type float member attached to said valve member and adapted to entrap air and operate as a float in the presence of water, a bimetallic thermostat disposed within said float member and comprising a plurality of U-shaped bimetallic strips, an abutment member for said bimetallic thermostat mounted on the end wall of said casing, and means for guiding said float member and said valve member comprising a post having a loose telescopic engagement with said abutment member and said valve member at the axis of said float member, said post being of noncircular cross section and passing through correspondingly shaped apertures in the legs of said U-shaped strips whereby expansion and contraction of said thermostat operates to move said valve member only in the direction of the axis of said post.

3. In an air valve, the combination of a casing, a valve seat member mounted in an aperture in the end of said casing and provided with a passage therethrough for the escape of air, said valve seat member being interiorly restricted to provide a valve seat, a valve member operating telescopically within said passage and cooperating with said seat, an inverted bell-type float carried by said valve member and adapted to entrap air and operate as a float upon the rise of water around said float member, said valve member projecting into the interior of said float member and having a recessed inner end, an abutment member carried by the end of said casing and provided with a recessed inner end, a post having telescopic engagement with the recesses in said valve member and said abutment member and fitting loosely therein, and a bimetallic thermostat disposed within said float member and surrounding said post.

4. In an air valve, the combination of a casing having means of communication with a radiator, a float and thermostatic means within said casing, a valve member connected to said float and thermostatic means, means providing an air vent from the interior of said casing and affording a seat for said valve member, a casing extension communicating with said air vent and having an aperture in the wall thereof, an apertured partition in said casing extension between said air vent and said aperture, and means for controlling the rate of flow of air through said air vent comprising a member having elements of different size each of which is adapted to vary the size of the aperture in said partition.

5. In an air valve, the combination of a casing having means of communication with a radiator, a float and thermostatic means within said casing, a valve member connected to said float and thermostatic means, means providing an air vent from the interior of said casing and affording a seat for said valve member, a casing extension communicating with said air vent and provided with an aperture in the wall thereof, an apertured partition in said casing extension between said air vent and said aperture, a disk adapted to assume a plurality of positions on said partition and provided with a plurality of differently sized elements each of which is adapted to vary the size of the aperture in said partition, and means to retain said disk against movement relatively to said partition.

6. In an air valve, the combination of a casing having means of communication with a radiator, a float and thermostatic means within said casing, a valve member connected to said float and thermostatic means, means providing an air vent from the interior of said casing and affording a seat for said valve member, a casing extension communicating with said air vent and provided with an aperture in the wall thereof, an apertured partition in said casing extension between said air vent and said aperture, a disk non-rotatably mounted on said partition and provided with a plurality of differently sized elements each of which is adapted to vary the size of said partition aperture, and means for locking said disk against said partition including a cap for closing said casing extension.

7. In an air valve, in combination with a casing provided with an air outlet passage, a valve member adapted to open and close said passage, an inverted bell-type float member attached to said valve member and adapted to entrap air and operate as a float in the presence of water, an abutment member carried by said casing, a post having spherical surfaces of engagement with said valve member and said abutment member, and a bimetallic thermostat disposed within said float member and guided by said post.

8. In an air valve, in combination with a casing provided with an air outlet passage, a valve member adapted to open and close said passage, an inverted bell-type float member attached to said valve member and adapted to entrap air and operate as a float in the presence of water, an abutment member carried by said casing, a bimetallic thermostat reacting between said abutment member and said valve member, and means for maintaining the line of reaction of said thermostat substantially in line with the axis of said valve member comprising a post having spherical surfaces of engagement telescopically and loosely engaging said abutment member and said valve member and passing through apertures in said thermostat.

9. In an air valve, in combination with a casing provided with an air outlet passage, a valve member adapted to open and close said passage, an inverted bell-type float member attached to said valve member and adapted to entrap air and operate as a float in the presence of water, a valve seat member telescopically associated with said valve member, said valve member having a spherical surface of contact with said valve seat member, an abutment member comprising an elongated set screw having a recessed inner end carried by said casing, a bimetallic thermostat disposed within said float member and reacting between said abutment member and said valve member, and means within said float member and mounted in said recessed abutment member for centering said thermostat and said float member.

10. In an air valve, the combination of a casing having means of communication with a radiator, a valve member within said casing, means providing an air vent from the interior of said casing and affording a seat for said valve member, valve operating means, and a casing extension communicating with said air vent and having an aperture in its exterior wall for the escape of air, said casing extension providing a chamber in direct communication with the atmosphere through said aperture and in which condensed moisture may be trapped, said chamber having a wall heatable by the steam within said casing whereby said condensed moisture may be vaporized and providing a second chamber in communication with said first named chamber and with said air vent.

ALONZO H. MAGEE.